United States Patent [19]
Schmidt et al.

[11] Patent Number: 5,755,408
[45] Date of Patent: May 26, 1998

[54] FLUID FLOW CONTROL DEVICES

[76] Inventors: Robert N. Schmidt, 1721 Fulton Rd., Cleveland, Ohio 44113; Greg S. Shaw, 2353 Charney Rd., University Heights, Ohio 44118

[21] Appl. No.: 415,418

[22] Filed: Apr. 3, 1995

[51] Int. Cl.[6] .................................................. B64C 21/00
[52] U.S. Cl. ........................... 244/204; 244/130; 244/199
[58] Field of Search .................................. 244/204, 130, 244/199, 213, 201, 207; 251/129.06

[56] References Cited

U.S. PATENT DOCUMENTS

| | | | |
|---|---|---|---|
| 2,951,662 | 9/1960 | Theodorsen | 244/207 |
| 3,586,267 | 6/1971 | Ingelman-Sundberg | 244/213 |
| 4,039,161 | 8/1977 | Bauer | 244/213 |
| 4,581,624 | 4/1986 | O'Connor | 251/129.06 |
| 5,029,805 | 7/1991 | Albarda et al. | 251/129.06 |
| 5,209,438 | 5/1993 | Wygnanski | 244/199 |
| 5,286,002 | 2/1994 | Bergstrom | 251/129.06 |
| 5,295,509 | 3/1994 | Suto et al. | 251/129.06 |

FOREIGN PATENT DOCUMENTS

| | | | |
|---|---|---|---|
| 49205 | 5/1992 | Japan | 244/130 |
| 516892 | 1/1993 | Japan | 244/199 |

OTHER PUBLICATIONS

"Miniscule Flaps Face Big Job on Jets' Wings", The Wall Street Journal, Friday, Nov. 25, 1994.
"Aviation Smart Wings", Popular Science, Mar. 1995.

*Primary Examiner*—Andres Kashnikow
*Assistant Examiner*—Tien Dinh

[57] ABSTRACT

A fluid flow control device, comprising a flow surface over which a fluid flows, a flow effect means located on the flow surface and operated by pressure such that the flow effect means improves the flow characteristics of the flow surface, pressure supply means to operate the flow effect means and at least one microelectromechanical system ("MEMS") valve means which controls the flow effect means by controlling the supply of pressure to the flow effect means from the pressure supply means.

47 Claims, 2 Drawing Sheets

FLUID FLOW CONTROL DEVICES

BACKGROUND OF THE INVENTION

The present invention relates generally to the field of fluid flow control devices and, more specifically, to the field of active fluid flow control devices employing microelectromechanical systems ("MEMS") technology.

Fluid flow control devices are typically utilized to enhance the efficiency and maneuverability of vehicles as they move through a fluid, e.g. air or water. Efficiency and maneuverability, along with other performance characteristics, are directly affected by the particular dynamics of the fluid as it flows over the surface of the vehicle. Minor disruptions in the boundary layer, the fluid flowing at the surface of the vehicle, will produce substantial effects on vehicle performance. If uncontrolled, these effects may have detrimental consequences ranging from increased drag to surging or stalling of the vehicle. At the very worst, as in the case of an aircraft, this could be disastrous. At the very least, this could result in increased fuel cost.

In ideal conditions, fluid is expected to flow in a laminar fashion over the entire extent of the flow surface. In practical application, though, this laminar characteristic breaks down eventually resulting in a phenomenon called flow separation. Flow separation produces fluid temperature, pressure and velocity differentials creating the detrimental effects on the vehicle performance. Controlling flow separation, then, is seen as critical to controlling the performance and safety of the vehicle.

Traditionally, efforts to control flow separation employ either active or passive devices, or a combination thereof. These devices modify surface shape and/or roughness or surface porosity using conventionally-sized components. Such surface shape and/or roughness devices include adjustable flaps, vortex generators, tapered fins, scoops and mini-domes. Conventional surface porosity devices include perforated liners in aircraft engine inlets and slot or perforated arrays located on the lifting surface of airfoils. These conventional devices utilize or create a controlled turbulence to facilitate streamwise fluid movement to delay flow separation. These devices, though, are of a fixed or limited-variable geometry and, therefore, provided effective control for a very limited range of operation, such as takeoff or landing, in the case of aircraft.

Effective turbulence generation and control is not only necessary for flow separation control, but can also be beneficial in, and of, itself. Turbulence generation and control at certain points along the flow surface, and at certain times during the travel regime, have been proven to reduce drag and, in the case of aircraft, increase lift. Therefore, the development of devices capable of generating and controlling turbulence to have effect over a wider range of operation is highly desirable. Attempts to develop such devices typically employ conventional, macroscopic components which cannot provide effective turbulence generation and control for the range of operation required by current and future sophisticated aircraft and watercraft. The complexity, size and power requirements of conventional active devices have detrimental effects on the performance of the vehicle offsetting any benefits obtained through greater turbulence generation and control. Conventional passive devices, although not having the complexity, size or power requirements, are always deployed, thereby generating turbulence even during travel regimes where the turbulence is detrimental.

Recent developments in MEMS technology have led to attempts to design an active micromachined fluid flow control device. These attempts, though, have resulted in devices with limited practical effectiveness due to the brittleness of the silicon substrate, surface profile restrictions, and small actuator displacement.

Accordingly, a need exists for a simple, lightweight, active fluid flow control device employing MEMS technology which provides effective fluid flow control over a wide range of operation without having high power requirements.

SUMMARY OF INVENTION

The present invention provides a device to satisfy the aforementioned need.

Accordingly, the present invention relates to a fluid flow control device, comprising a flow surface over which a fluid flows, a flow effect means incorporated into the flow surface and operated by pressure such that the flow effect means improves the flow characteristics of the flow surface, pressure supply means to operate the flow effect means and at least one MEMS valve means which controls the flow effect means by controlling the supply of pressure to the flow effect means from the pressure supply means.

BRIEF DESCRIPTION OF THE DRAWINGS

Further features of the present invention will become apparent to those skilled in the art to which the present invention relates from reading the following specification with reference to the accompanying drawings in which.

DESCRIPTION OF THE PREFERRED EMBODIMENT

Figure 1:
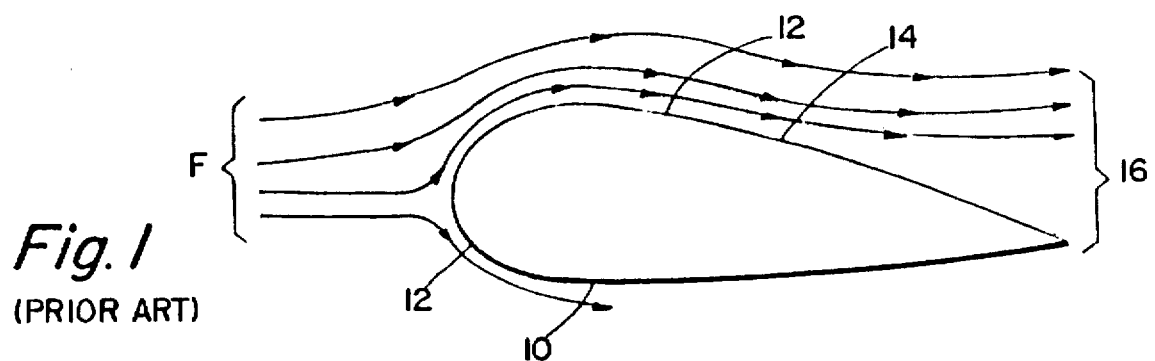
FIG. 1 is a simplified view of a fluid flowing over a flow surface.

Referring now to the drawings and, in particular FIG. 1, there is shown a flow surface 10. Fluid "F" is shown flowing over the flow surface 10. As the fluid "F" begins to flow over the flow surface 10, the fluid "F" at the flow surface 10 forms a boundary layer 12 which has a laminar characteristic. The boundary layer 10 typically has a thickness on the order of one millimeter but can be significantly larger or smaller depending on the fluid "F" and the flow conditions. When certain conditions exist, flow separation 16 can occur at a point 14 on the flow surface 10 and the boundary layer 12 separates from the flow surface 10 beyond that point 14. The presence and location of the flow separation 16 from the flow surface 10 results in detrimental effects. Such detrimental effects can include increased drag, decreased fuel efficiency, loss of maneuverability, surging and, in the case of aircraft, stalling and decreased lift.

Figure 2:
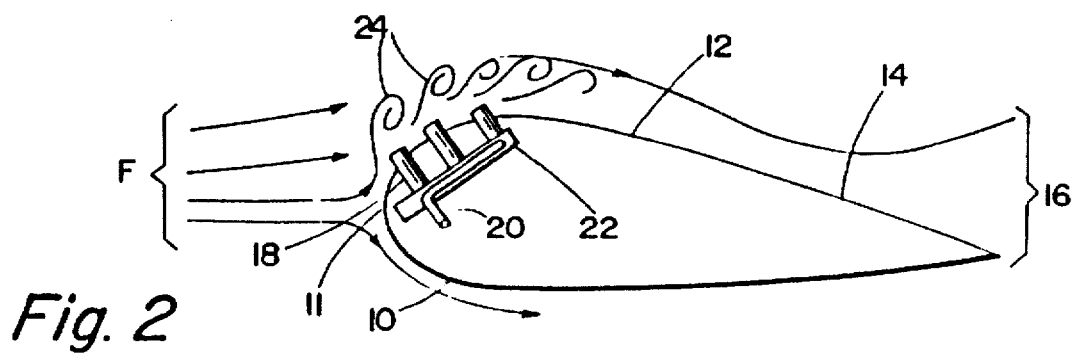
FIG. 2 is a view of a flow surface showing flow effect means, pressure supply means and MEMS valve means.

Referring now to FIG. 2, there is shown a view of a flow surface 10. Flow effect means 18 is incorporated into the flow surface 10. The flow effect means 18 is operated by pressure supplied by the pressure supply means 20 and improves the flow characteristics of the flow surface 10. At least one MEMS valve means 22 controls the flow effect means 18 by controlling the supply of pressure thereto from the pressure supply means 20. Advantageously, the flow effect means 18 is a turbulence generator. Turbulence 24 generated in the fluid "F" in the boundary layer 12 by the flow effect means 18 tends to delay the point 14 beyond which flow separation 16 occurs, and may even prevent flow separation 16 altogether. Also, locating the flow effect means 18 so as to generate turbulence 24 near the leading edge 11 of the flow surface 10 of an aircraft can result in increased lift and decreased drag in addition to any effect on flow separation 16.

Figure 3:
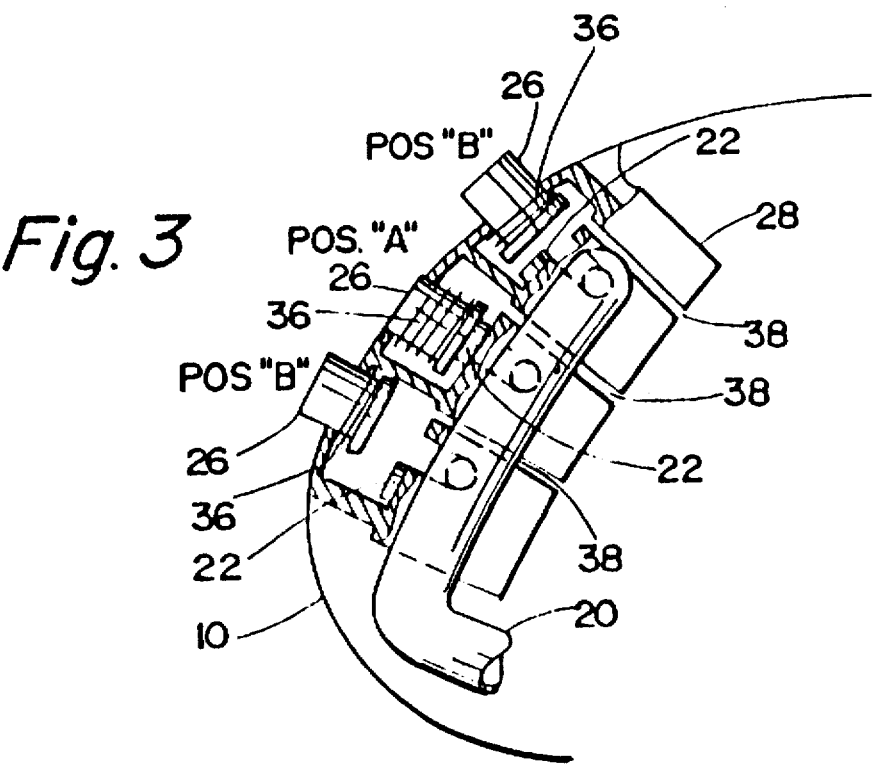
FIG. 3 is an enlarged view of the flow effect means.

Referring now to FIG. 3 there is shown an enlarged detail of the flow effect means 18 located on the flow surface 10. In the preferred embodiment of the present invention, the flow effect means 18 is comprised of at least one boundary layer penetrator 26 which acts as the turbulence generator. The boundary layer penetrator 26 is capable of moving into and out of the flow surface 10, POS. "A" and POS. "B", respectively. The MEMS valve means 22 controls the movement of the boundary layer penetrator 26 by controlling the supply of pressure from the pressure supply means 20 to boundary layer penetrator 26. Depending on the shape of the flow surface 10, the boundary layer penetrator 26 can be any geometry but in the preferred embodiment of the present invention, a cylindrically shaped boundary layer penetrator 26 is utilized. The boundary layer penetrator 26 can be made of many materials, such as aluminum, or other metals, ceramics, polymers or composite materials, and can be very sturdy and capable of large displacements.

Advantageously, the displacements of the boundary layer penetrator 26 may be tailored for the specific application and can be made to apply to the thickest boundary layer 12. By using the MEMS valve means 22 to control the supply of pressure from the pressure supply means 20 to move the boundary layer penetrator 26, much larger displacements of the boundary layer penetrator 26 can be obtained as compared to a direct actuation MEMS device which itself protrudes into the fluid "F". Also, in the present invention the MEMS valve means is not exposed to, and accordingly, cannot be damaged by the debris which may be in the fluid "F" as can a direct actuation MEMS device.

In the preferred embodiment of the present invention, the MEMS valve means 22 is electrostatically actuated. Piezoelectrically, thermally and magnetically actuated MEMS valve means 22 may also be used. The pressure supply means 20, comprises a fluidic channel 28. In the preferred embodiment of the present invention, the pressure supply means 20 utilizes a pressurized sample of fluid "F". Both the MEMS valve means 22 and the fluidic channel 28 are lightweight and are manufactured utilizing micromachining techniques. In the preferred embodiment of the present invention, the MEMS valve means 22 and the fluidic channel 28 are micromachined from silicon material, although it is understood that other materials may be used.

In the preferred embodiment of the present invention, the normal position of the boundary layer penetrator 26 is within, and mounted approximately flush with, the flow surface 10 (POS. "A"). Upon actuation, the MEMS valve means 22 opens allowing pressure from the pressure supply means 20 to force the boundary layer penetrator 26 out of the flow surface 10 (POS. "B"). Alternatively, the normal position of the boundary layer penetrator 26 can be out of the flow surface 10 (POS. "B"). In this case, upon actuation, the MEMS valve means 22 opens to allow pressure from the pressure supply means 20 to force the boundary layer penetrator 26 into the flow surface 10 (POS. "A"). In either case, upon deactuation, the MEMS valve means 22 closes and reset means 36, 38 returns the boundary layer penetrator 26 to its normal position. In the preferred embodiment of the present invention, reset means is comprised of spring means 36 and vent means 38. It is understood that other means, such as a vacuum, may comprise the reset means.

Figure 4:
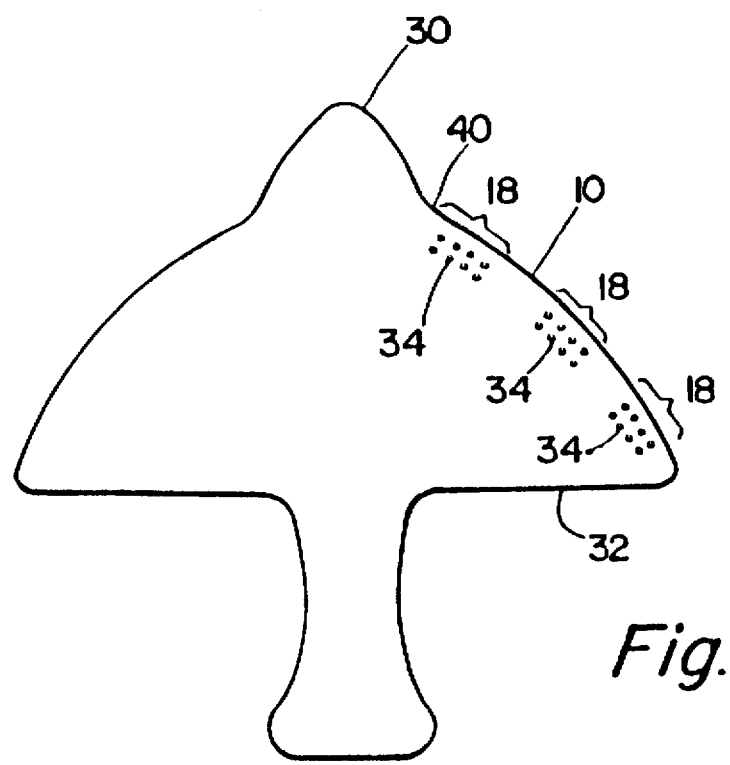
FIG. 4 is a partial plan view of an aircraft.

Referring now to FIG. 4 there is shown a partial plan view of an aircraft 30. The outer surface of the aircraft, particularly the wing 32, is a flow surface 10. Advantageously, the flow effect means 18 is arranged in at least one array 34 located in certain areas of the wing 32 in order to improve the aerodynamics of the wing 32 and, therefore, optimize control of the aircraft 30. The present invention can be particularly useful for decreasing drag and increasing lift when used on the leading edge 11 of the wing 32 near the root 40 thereof. An array 34 is comprised of at least one boundary layer penetrator 26. The boundary layer penetrator 26, along with the pressure supply means 20, the MEMS valve means 22 and reset means 36, 38 (not shown on FIG.4), operate as described above with reference to FIG.2 and FIG.3. In the case of an aircraft the fluid "F" is air. While in FIG. 4 an aircraft is shown, it is understood that the present invention can also be applied to watercraft in which case the outer surface of the watercraft is the flow surface 10.

While the preferred embodiment of the invention has been shown and described, it will be apparent to those skilled in this art that various modifications may be made in this embodiment without departing from the teachings of the present invention.

What is claimed is:

1. A fluid flow control device, comprising:
    a) a flow surface over which fluid flows;
    b) a flow effect means incorporated into said flow surface and operated by pressure, such that said flow effect means improves the flow characteristics of said flow surface;
    c) pressure supply means to operate said flow effect means; and
    d) at least one MEMS valve means which controls said flow effect means by controlling the supply of pressure to said flow effect means from said pressure supply means.

2. The fluid flow control device of claim 1 wherein said flow effect means is a turbulence generator.

3. The fluid flow control device of claim 1 wherein said flow surface is the outer surface of an aircraft.

4. The fluid flow control device of claim 1, wherein said flow surface is the outer surface of a watercraft.

5. The fluid flow control device of claim 1, wherein said flow effect means is comprised of at least one boundary layer penetrator having a normal position capable of moving into and out of said flow surface such that the movement of said boundary layer penetrator is controlled by said MEMS valve means such that upon actuation of the MEMS valve means said boundary layer penetrator moves from a normal position.

6. The fluid flow control device of claim 5, wherein said boundary layer penetrator is cylindrical.

7. The fluid flow control device of claim 1 wherein said MEMS valve means is electrostatically actuated.

8. The fluid flow control device of claim 1 wherein said MEMS valve means is piezoelectrically actuated.

9. The fluid flow control device of claim 1 wherein said MEMS valve means is thermally actuated.

10. The fluid flow control device of claim 1 wherein said MEMS valve means is magnetically actuated.

11. The fluid flow control device of claim 1 wherein said pressure supply means comprises a micromachined fluidic channel.

12. The fluid flow control device of claim 11 wherein said micromachined fluidic channel comprises a semiconductor material.

13. The fluid flow control device of claim 1 wherein said pressure supply means utilizes a pressurized sample of fluid flowing over said flow surface flows.

14. The fluid flow control device of claim 5, further comprising reset means such that said reset means returns said boundary layer penetrator to its normal position upon deactuation of said MEMS valve means.

15. The fluid flow control device of claim 5 wherein said normal position of said boundary layer penetrator is in, and approximately flush with, said flow surface.

16. The fluid flow control device of claim 5 wherein said normal position of said boundary layer penetrator is out of said flow surface.

17. The fluid flow control device of claim 14 wherein said reset means comprises spring means and vent means.

18. The fluid flow control device of claim 14 wherein said reset means comprises a vacuum.

19. A fluid flow control device, comprising:
   a) a flow surface over which fluid flows;
   b) a flow effect means incorporated into said flow surface comprising at least one boundary layer penetrator having a normal position and capable of moving into and out of said flow surface such that the movement of said boundary layer penetrator improves the flow characteristics of said flow surface;
   c) pressure supply means to operate said flow effect means;
   d) at least one MEMS valve means which controls said flow effect means by controlling the supply of pressure to said boundary layer penetrator from said pressure supply means such that upon actuation of said MEMS valve means said boundary layer penetrator moves from a normal position; and
   e) reset means such that said reset means returns said boundary layer penetrator to its normal position upon deactuation of said MEMS valve means.

20. The fluid flow control device of claim 19 wherein said flow effect means is a turbulence generator.

21. The fluid flow control device of claim 19 wherein said flow surface is the outer surface of an aircraft.

22. The fluid flow control device of claim 19 wherein said flow surface is the outer surface of a watercraft.

23. The fluid flow control device of claim 19 wherein said boundary layer penetrator is cylindrical.

24. The fluid flow control device of claim 19 wherein said MEMS valve means is electrostatically actuated.

25. The fluid flow control device of claim 19 wherein said MEMS valve means is piezoelectrically actuated.

26. The fluid flow control device of claim 19 wherein said MEMS valve means is thermally actuated.

27. The fluid flow control device of claim 19 wherein said MEMS valve means is magnetically actuated.

28. The fluid flow control device of claim 19 wherein said pressure supply means comprises a micromachined fluidic channel.

29. The fluid flow control device of claim 28 wherein said micromachined fluidic channel comprises a semiconductor material.

30. The fluid flow control device of claim 19 wherein said pressure supply means utilizes a pressurized sample of fluid flowing over said flow surface.

31. The fluid flow control device of claim 19 wherein said normal position of said boundary layer penetrator is in said flow surface.

32. The fluid flow control device of claim 19 wherein said normal position of said boundary layer penetrator is out of said flow surface.

33. The fluid flow control device of claim 19 wherein said reset means comprises spring means and vent means.

34. The fluid flow control device of claim 19 wherein said reset means comprises a vacuum.

35. A fluid flow control device, comprising:
   a) a wing of an aircraft, said wing having a leading edge;
   b) at least one array of flow effect means incorporated in said wing, said flow effect means being a turbulence generator comprised of at least one boundary layer penetrator having a normal position and capable of moving into and out of said wing such that the movement of said boundary layer penetrator improves the aerodynamics of said wing;
   c) pressure supply means to operate said boundary layer penetrator, said pressure supply means comprised of a micromachined fluidic channel;
   d) at least one MEMS valve means which controls said flow effect means by controlling the supply of pressure to said boundary layer penetrator from said pressure supply means such that upon actuation of said MEMS valve means said boundary layer penetrator moves from its normal position; and
   e) reset means such that said reset means returns said boundary layer penetrator to its normal position upon deactuation of said MEMS valve means.

36. The fluid flow control device of claim 35 wherein said array is located on the leading edge of said wing.

37. The fluid flow control device of claim 35 wherein said boundary layer penetrator is cylindrical.

38. The fluid flow control device of claim 35 wherein said MEMS valve means is electrostatically actuated.

39. The fluid flow control device of claim 35 wherein said MEMS valve means is piezoelectrically actuated.

40. The fluid flow control device of claim 35 wherein said MEMS valve means is thermally actuated.

41. The fluid flow control device of claim 35 wherein said MEMS valve means is magnetically actuated.

42. The fluid flow control device of claim 35 wherein said micromachined fluidic channel comprises a semiconductor material.

43. The fluid flow control device of claim 35 wherein said pressure supply means utilizes a pressurized sample of air flowing over said wing.

44. The fluid flow control device of claim 35 wherein said normal position of said boundary layer penetrator is in said wing.

45. The fluid flow control device of claim 35 wherein said normal position of said boundary layer penetrator is out of said wing.

46. The fluid flow control device of claim 35 wherein said reset means comprises spring means and vent means.

47. The fluid flow control device of claim 35 wherein said reset means comprises a vacuum.

* * * * *